United States Patent [19]
Markandey et al.

[11] Patent Number: 6,128,539
[45] Date of Patent: Oct. 3, 2000

[54] METHOD AND APPARATUS FOR FORMING IMAGE SCALING FILTERS

[75] Inventors: Vishal Markandey, Dallas; Robert John Gove, Plano, both of Tex.

[73] Assignee: Texas Instruments Incorporated, Dallas, Tex.

[21] Appl. No.: 08/298,547

[22] Filed: Aug. 30, 1994

[51] Int. Cl.$^7$ .............................. G05B 13/02; G06F 15/00
[52] U.S. Cl. ............................................... 700/29; 702/190
[58] Field of Search .................................... 364/488, 514, 364/572; 700/29; 702/190

[56] References Cited

U.S. PATENT DOCUMENTS

| | | | |
|---|---|---|---|
| 5,097,322 | 3/1992 | Fairhurst | 358/31 |
| 5,212,659 | 5/1993 | Scott et al. | 364/724.1 |
| 5,335,020 | 8/1994 | Dieterich | 348/614 |
| 5,337,261 | 8/1994 | Rogers | 364/572 |
| 5,384,869 | 1/1995 | Wilkinson et al. | 382/56 |
| 5,422,827 | 6/1995 | Niehaus | 364/514 |

FOREIGN PATENT DOCUMENTS

| | | | |
|---|---|---|---|
| 5160675 | 6/1993 | Japan | H03H 17/02 |
| 2174861 | 11/1986 | United Kingdom | H04N 5/262 |

OTHER PUBLICATIONS

Lien, Brian K., "On the Cascade Realization of 2–D FIR Filters Designated by McCellan Transformation," IEEE Transactions on Signal Processing, vol. 40, No. 9, Sep. 1992. pp. 2338–2340.

Horning, Darrell W., and Chassaing, Rulph, "IIR Filter Scaling for Real–Time Signal Processing," IEEE Transaction on Education, vol. 34, No. 1, Feb. 1991, pp. 108–112.

George Wolberg, Digital Image Warping, IEEE Computer Society Press, Los Alamitos, CA, pp. 129–133.

Nakamura et al., "Fast Calculation of the Coefficients of the Generalized McClellan Transform in 2–D FIR Filter Design", Circuits & Systems, 1993.

Hartnett et al., "On the Use of Cyclotomic Polynomial Prefilters for Efficient FIR Filter Design", IEEE Transactions on Signal Processing, vol. 41, No. 5, 1993.

Wong, "A Clustering Filter for Scale–Space Filtering and Image Restoration", Computer Vision and Pattern Recognition, 1993.

Jeong, "Adaptive Determination of Filter Scales for Edge Detection", IEEE Transactions on Pattern Analysis & Machine Intelligence, vol. 14, No. 5, 1992.

Zaulbaus et al., "Design of Signal Dependent Time–Frequency Kernels by McClellan Transformation", Tim–Frequency and Time Scale Analysis 1992 Int'l Symposium, 1992.

Adams et al., "New Quadratic Programming Algorithms for Designing FIR Digital Filters", Signals, Systems & Computers, 1993 27th Asilomar Conf., 1993.

Bomar et al., "Method for Accelerating the Design of Optimal Linear–Phase FIR Digital Filters", IEEE Transactions on Signal Processing, vol. 39, No. 6, 1991.

Murakosi et al., "Frequency Scramble for Secure Communication of Images Using Multidimensional Digital Filters", Circuits and Systems, 1992 Midwest Symposium, 1992.

Primary Examiner—William A. Cuchlinski, Jr.
Attorney, Agent, or Firm—Robert L. Troike; Frederick J. Telecky, Jr.

[57] ABSTRACT

A method of forming an image scaling filter for converting a first number of input lines to a second number of output lines comprises the steps of determining an optimal frequency response without sharp cutoffs for a given scaling factor and for a determined number of taps per line 102. Filter coefficients are provided based on the determined filter taps per line and the determined optimal frequency response 103. The coefficients are grouped into sets 104 corresponding to the taps per output line and the coefficients are rescaled so the sum of the set equals one 105. The input lines are multiplied by the rescaled coefficients and summed 106 to achieve the output line values.

4 Claims, 8 Drawing Sheets

LINEAR INTERPOLATION FILTER:

FILTER KERNEL

FIG. 1a

ALIASING (3 TO 4 SCALING):

FIG. 1b

FREQUENCY RESPONSE

FIG. 1c

APERTURE EFFECT:

INPUT:

OUTPUT:

OPTIMAL FREQUENCY RESPONSE

FIG. 9a          FIG. 9b          FIG. 9c

METHOD AND APPARATUS FOR FORMING IMAGE SCALING FILTERS

TECHNICAL FIELD OF THE INVENTION

This invention relates to displays and, more particularly, to the formation of image scaling filters for displays.

BACKGROUND OF THE INVENTION

It has become highly desirable to provide video displays in many formats. There are different modes for different image formats such as panoramic wide screen or movie. There are also different video formats for computer video displays depending upon whether the video display is a VGA (640 pixels in each row×480 rows of pixels, where a pixel is a picture element), or a super VGA, or an XGA, Further, there are different television formats from the standard NTSC to as much as 1920 pixels in each row by 1080 rows for High Definition TV (HDTV) format. Further there are flat panel displays and a Digital Mirror Device (DMD), which is a new projection display that utilize reflections from hundreds of thousands of micromirrors, each mounted above its own cell memory.

Within the operation of such a system, it may be desirable to have a panoramic view or wide screen view, or a movie screen view, again requiring some modifications of the number of lines of the video signal from a source to the number of lines in the output signal.

Figure 1A:
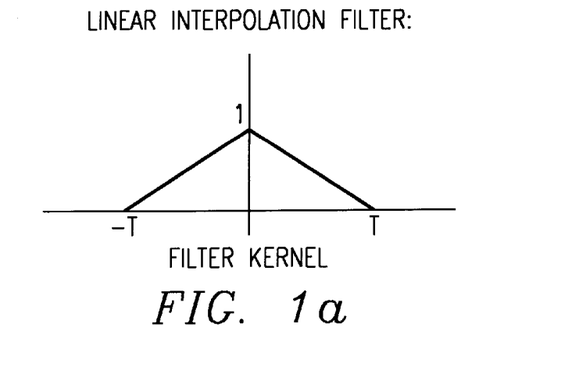
FIG. 1a illustrates the filter kernel of a bilinear interpolation filter.
Figure 1B:
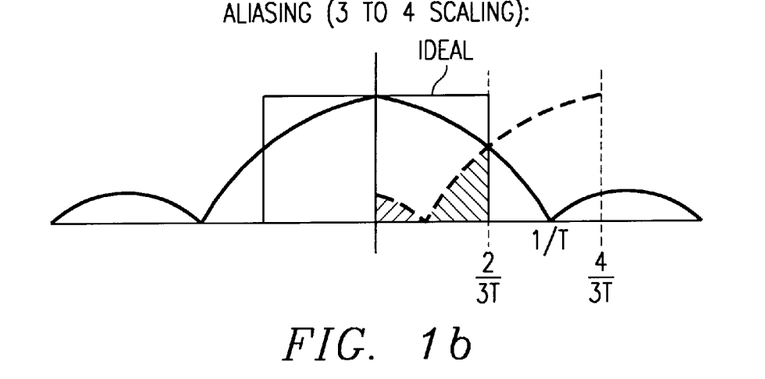
FIGS. 1b and 1c illustrate the frequency response of a bilinear interpolation filter with 3 to 4 scaling.
Figure 1C:
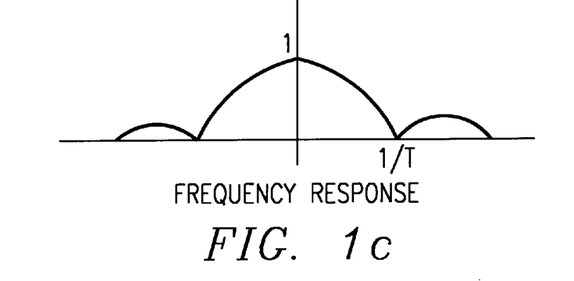
Figure 1D:
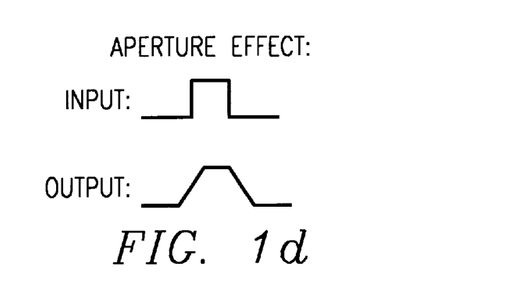
FIG. 1d illustrates the aperture effect.

This is achieved by some form of image scaling. In order to achieve these changes in formats, scaling filters have been used. One such known filter is a bilinear interpolation filter, which suffers from the two problems of aliasing (unwanted patterns) and aperture effect, or image softening (blurring). These problems are illustrated in FIG. 1. FIG. 1a illustrates the bilinear filter kernel, FIGS. 1b and 1c illustrate the frequency response.

The aliasing problem can be understood by considering the frequency response of the bilinear filter for an example of a three to four scaling in FIG. 1. Image scaling is basically an image filtering and resampling operation. If $X(w)$ is the frequency domain representation of the original signal, then the resampling operation will create a scaled image whose frequency domain representation contains shifted replicas of $X(w)$, located at the new sampling frequency. These replicas can interact with each other if they are not completely separated from each other, leading to aliasing, as shown in the hatched portion in FIG. 1b.

The second problem is the aperture effect or image softening. This is caused by the fact that interpolation filters are basically low pass filters with high frequency roll-off as illustrated by the frequency response of bilinear interpolation in FIG. 1d.

Both of these problems relate to the frequency content of the signals and can become particularly objectionable with high bandwidth sources.

SUMMARY OF THE INVENTION

In accordance with one embodiment of the present invention, an improved image scaling filter is achieved by estimating a close to ideal frequency response of the filter without sharp cut-offs. The estimated frequency response is then fed to a design algorithm along with the constraints such as a number of filters taps required, which computes a set of filter coefficients for scaling. The set of filter coefficients are scaled so that each set sums to a value of one. The appropriate set of input elements is multiplied by the filter coefficients and the set is summed to one output line.

DESCRIPTION OF THE INVENTION

FIG. 6 illustrates frequency domain responses of the bilinear filter of the prior art (FIG. 6a) and two new scaling filters with a first filter with 4 taps (FIG. 6b) and a second filter with 6 taps (FIG. 6c).

DETAILED DESCRIPTION OF PREFERRED EMBODIMENTS

Figure 2:
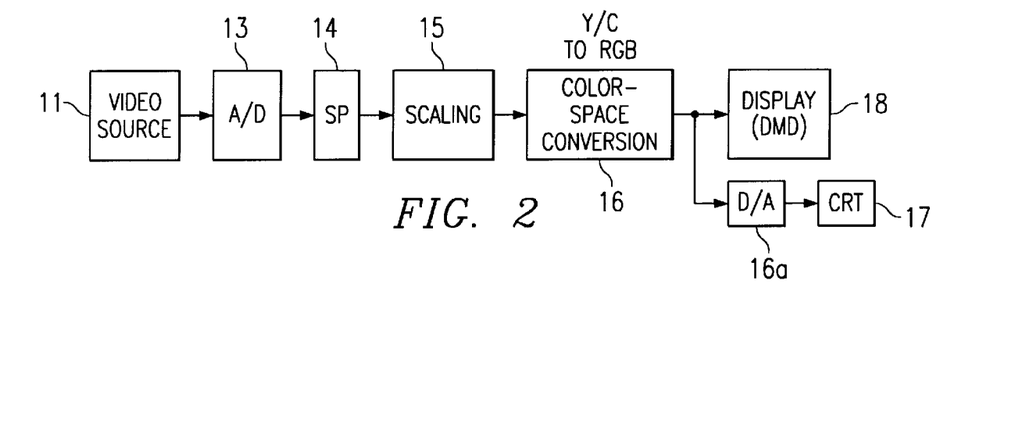
FIG. 2 is an overall block diagram of a video display system.

Referring to FIG. 2, there is illustrated a video display system using the image scaling filters in accordance with the present invention. A video source 11, which may be from a cable, a VCR, or some other source, is applied through the A/D (analog-to-digital) converter 13 and the digital representation of the video signal which includes signal decoding at signal processor 14 to convert from decoded composite to luminance Y and chrominance C (I & Q) signals whether it be interlaced or non-interlaced depending upon the application. The output Y and C is applied through a scaling filter 15, which in turn may be applied through a color-space conversion 16 through a digital to analog (D/A) converter 16a to a CRT 17, or directly applied from conversion 16 to a display such as a digital mirror device (DMD) display 18, which was described in a 1987 article by Larry J. Hornbeck, a Texas Instrument Inc. scientist and described for example in the November issue of *The Institute of Electrical and Electronic Engineers Spectrum*, pages 27–31. In some cases, the scaling may be done after the color-space conversion. In the case of a VGA input, no color-space conversion is used. The video signals may be digital, in which case there is no analog-to-digital conversion. The input digital signals may also be non-video imagery digital signals from a photographic or printing device, and the picture elements from these are to be scaled up (increasing picture size) or scaled down (decreasing picture size).

Figure 3:
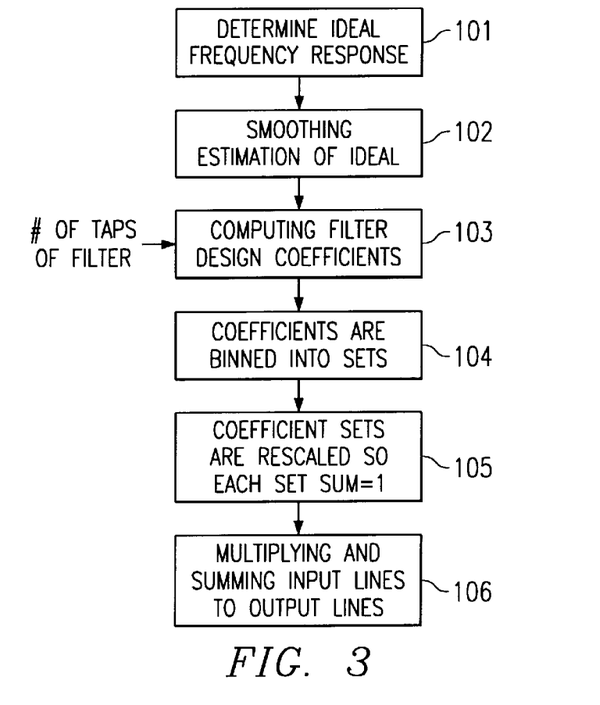
FIG. 3 is a flow chart of the method according to the present invention.

Referring to FIG. 3, there is illustrated a flow chart for the method of the present invention for designing optimal scaling filters to overcome the problems explained in the Background of the Invention Section. The first step 101 is to determine the ideal frequency response. FIG. 1b illustrates by the heavy line marked "ideal" identifies for the 3 to 4 scaling the ideal frequency response. This ideal frequency response eliminates aliasing while at the same time reducing the aperture effect. However, such ideal frequency response with abrupt cutoff cannot be realized in practice.

Figure 4A:
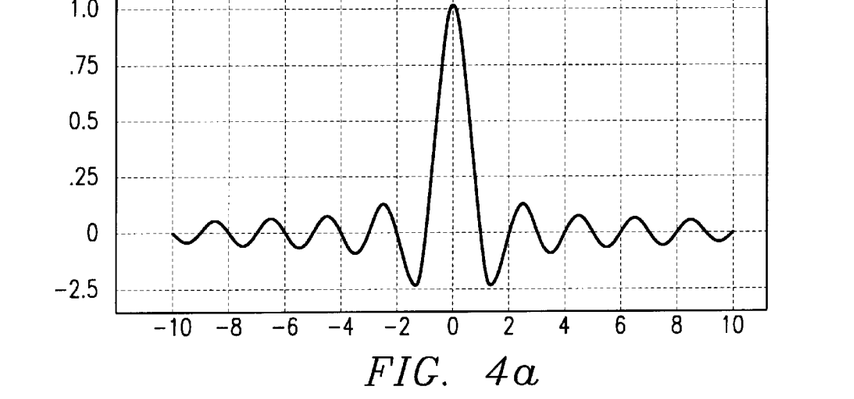
FIG. 4a illustrates an ideal frequency response for a 3 to 4 scale filter.
Figure 4B:
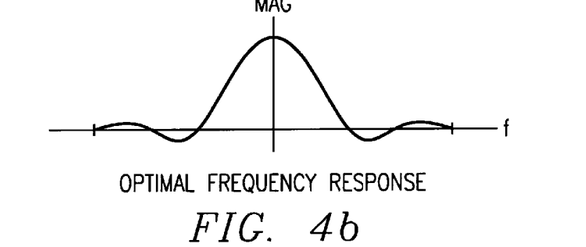
FIG. 4b illustrates an optimal frequency response.

FIG. 4a, there is illustrated another ideal frequency response for a 3 to 4 scale filter. The zero crossing of that signal changes for each scale factor. The ideal frequency response, however, has a response that goes on for infinity and also cannot be realized in practice. In accordance with the present invention, for a given scale factor Applicant's invention computes first the ideal frequency response and then uses that in step 102 to estimate a desired optimal frequency response. Computation of optimal frequency response from ideal frequency response is an iterative process. Different numbers of filter taps and smoothings are tried and in each iteration the difference between the optimal and actual frequency response is measured. This process is iterated until the optimal and ideal response are close to each other (within acceptable bound of tolerance). The optimal frequency response is done by smoothing depending upon how many filter taps. FIG. 4b illustrates the smoothing estimate of FIG. 4a. Once this smoothing estimate is determined, then it is fed into a filter design algorithm (such as the Parks-McClellan algorithm) in step 103, along with the desired number of filter taps. The Parks-McClellan algorithm is commercially available (e.g., as part of the MATLAB software package). The MathWorks, Inc., Cochituate Place, 24 Prime Parkway, Natick, Mass. 01760.

The Parks-McClellan FIR filter design algorithm is perhaps the most popular and widely used FIR filter design methodology. In the Signal Processing Toolbox, the function called remez designs linear phase FIR filters using the Parks-McClellan algorithm. The Parks-McClellan algorithm uses the Remez exchange algorithm and Chebyshev approximation theory to design filters with optimal fits between the desired and actual frequency responses. The filters are optimal in the sense that the maximum error between the desired frequency response and the actual frequency response is minimized. Filters designed this way exhibit an equiripple behavior in their frequency response, and hence are sometimes called equiripple filters.

The function $$b = \text{remez}\,(n, f, m)$$

returns row vector b containing the n+1 coefficients of the order in FIR filter whose frequency-magnitude characteristics match those given by vectors f and m. Vectors f and m specify the frequency-magnitude characteristics of the filter:

f is a vector of frequency points, specified in the range between 0 and 1, where 1.0 corresponds to half the sample frequency (the Nyquist frequency).

m is a vector containing the desired magnitude response at the points specified in f. The elements of m must appear in equal-valued pairs.

f and m must be the same length. The length must be an even number.

The first point of f must be 0 and the last point 1.

The frequencies must be in increasing order.

Duplicate frequency points are allowed, but remez will separate them by 0.1 if they are exactly coincident. Note that frequency transitions much faster than 0.1 are undesirable because they can cause large amounts of ripple in the magnitude response.

plot (f,m) can be used to display the filter shape.

Figure 5:
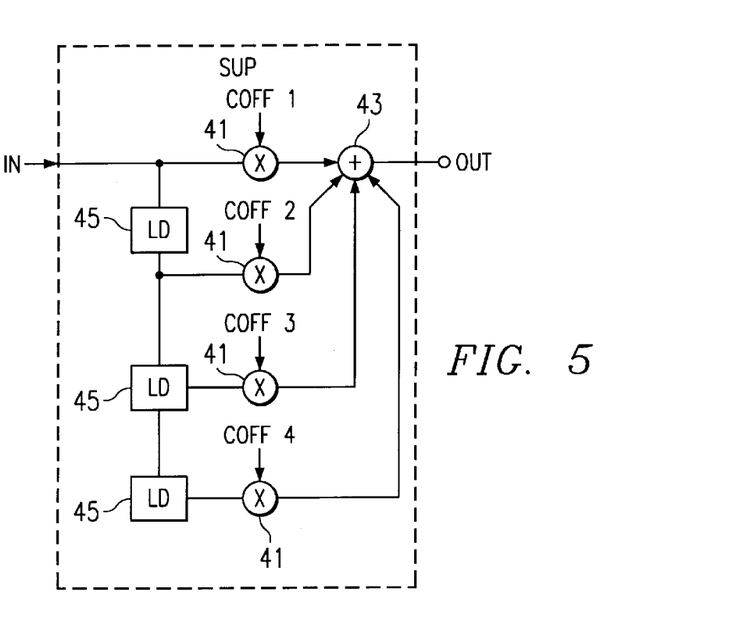
FIG. 5 illustrates how the delays and coefficients are operated on to achieve the desired line output in a vertical scaling function.

The number of filter taps directly impacts the cost of the real-time implementation of the filter. The filter design algorithm computes the set of multiplier coefficients to match with the number of taps in the optimal frequency response. The coefficients are collected or binned into sets for a given output line in step 104. The coefficient sets (step 105) are rescaled so for each set so the sum of the coefficients equals one (1). The input lines are multiplied and summed in step 106 to provide the values on the output lines. FIG. 5 illustrates a four tap filter for scaling. The four input lines are multiplied by the four coefficients at the four multipliers 41 and summed at summer 43. The four inputs are separated by the line delays 45.

Figure 6A:
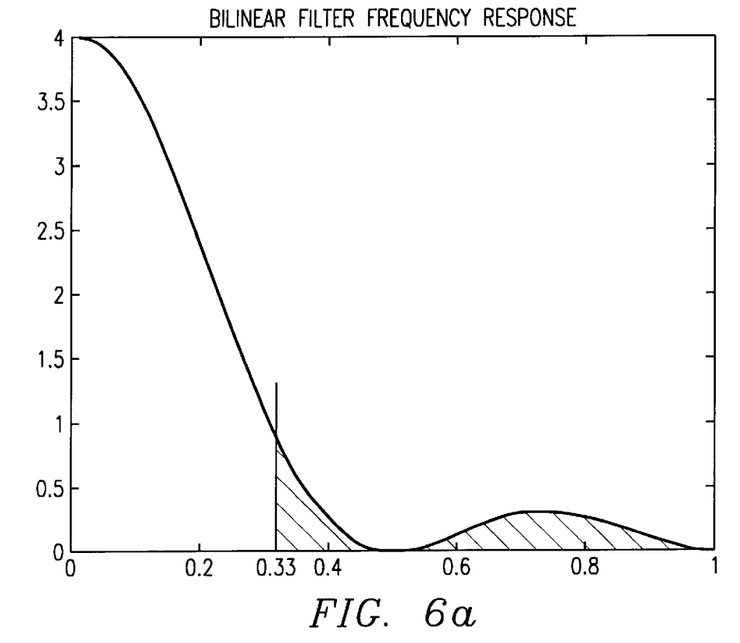
Figure 6B:
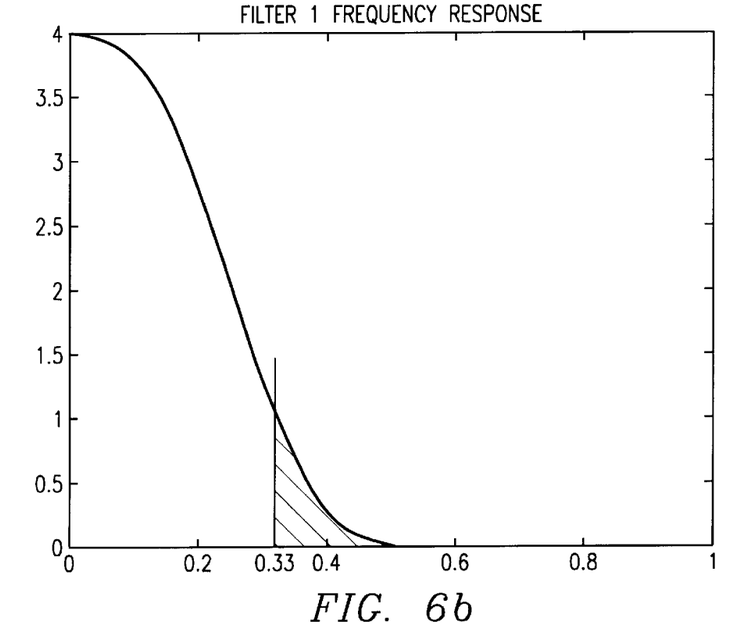
Figure 6C:
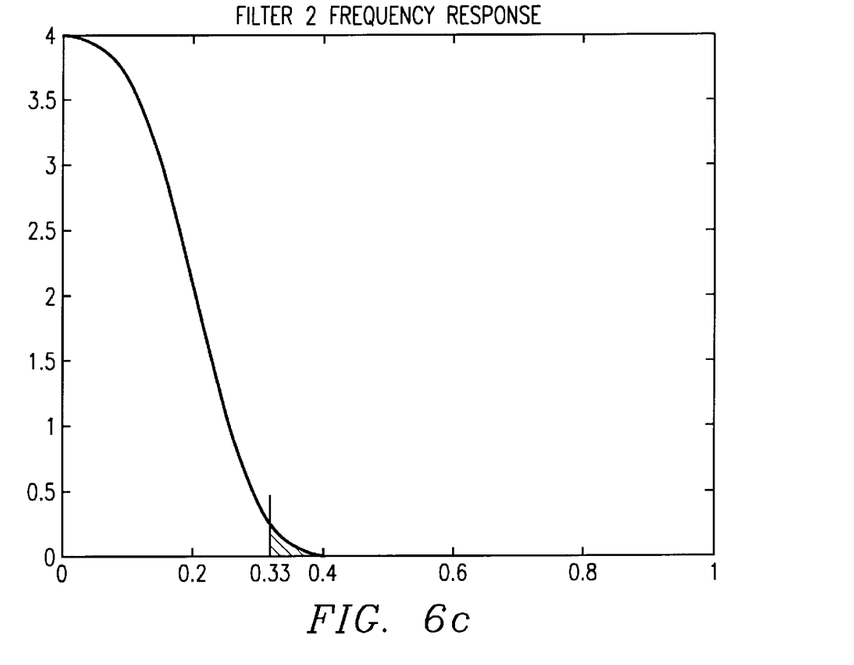

FIGS. 6b and 6c illustrate the frequency domain responses of two scaling filters designed using this method of 3 to 4 scaling. These filters are referred to as Filters 1 and 2, respectively. Filter 1 (FIG. 6b) has 4 taps per line, while Filter 2 (FIG. 6c) has 6 taps per line. The frequency response of bilinear filter is shown in FIG. 6a for comparison. The hatched portion of each frequency response corresponds to the aliasing region.

Figure 7A:
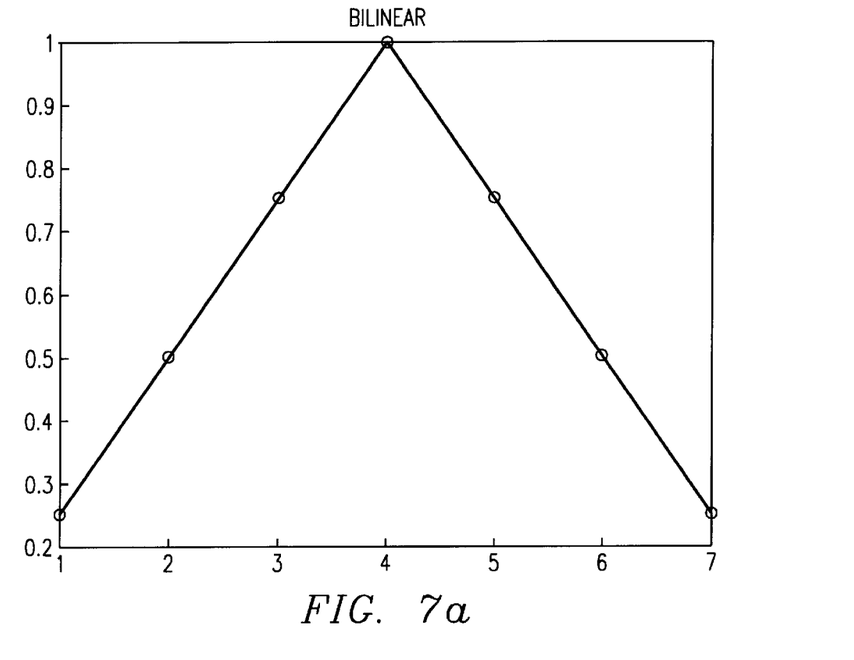
FIG. 7a illustrates filter kernel coefficients for bilinear filter of prior art.
Figure 7B:
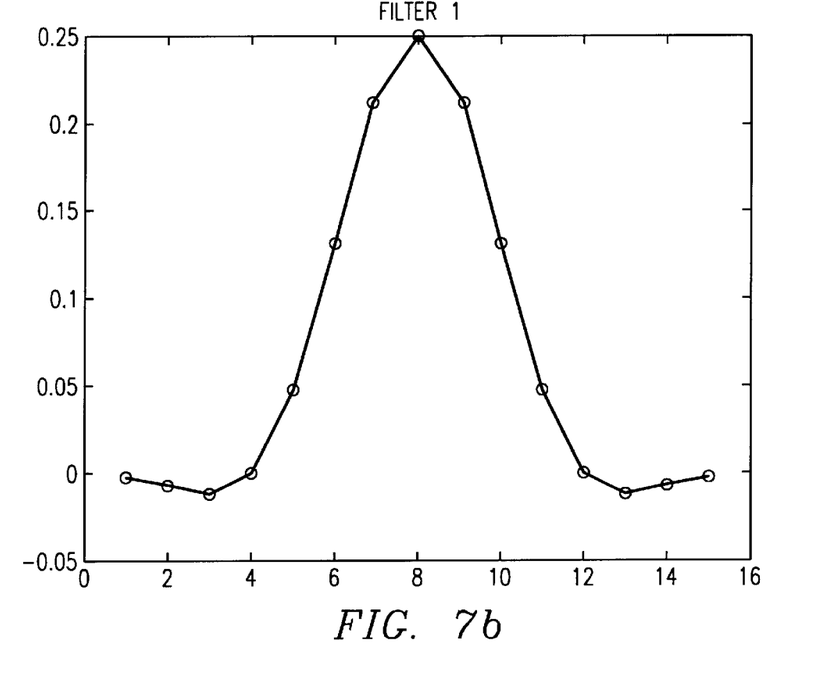
FIG. 7b illustrates the first filter coefficients.
Figure 7C:
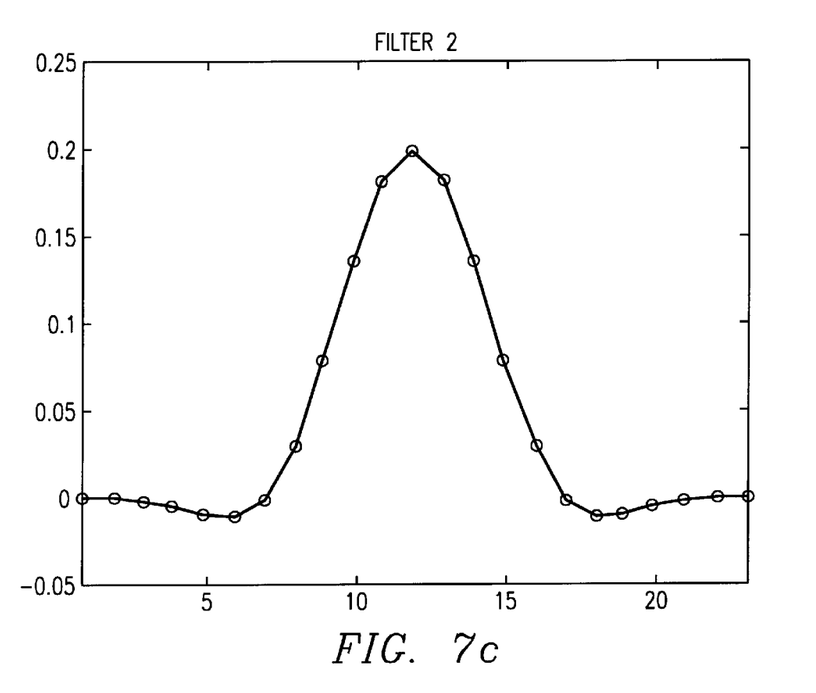
FIG. 7c illustrates the second filter coefficients.

FIG. 7 illustrates the filter kernels for bilinear interpolation (FIG. 7a), Filter 1 (FIG. 7b), and Filter 2 (FIG. 7c). Referring to FIG. 7a, there is illustrated the bilinear interpolation according to the prior art with the coefficients illustrated at two taps per line. There are seven coefficients, with the first and seventh coefficient being at 0.25, the second and sixth coefficient being at 0.50, the fourth coefficient being at the peak at the coefficient at 1.0, and coefficients three and five being at 0.75. In accordance with Applicant's invention shown in FIG. 7b, the Filter 1 with four taps per line has 15 coefficients with the values indicated ranging on both the first and the fifteenth being −0.0019 and having a maximum value of 0.25 at the eighth coefficient. The first coefficient is binned with the fifth, the ninth, and the thirteenth, which binned set then corresponds to a coefficient set for a given output line. FIG. 7b illustrates the sixteen coefficients for four taps per line for a 3 to 4 scaling filter. The number shown in the figure is the output from the filter design algorithm. As discussed previously, Applicant's method then decodes these numbers into a format suitable for actually implementing scaling filters. Thus the output of the filter design algorithm, which consists of the following set of numbers [−0.0019, −0.0077, −0.0128, 0.0, 0.0494, 0.1327, 0.2152, 0.25, 0.2152, 0.1327, 0.0494, 0.0, −0.0128, −0.0077, and −0.0019] are binned into the following sets, each set corresponding to a coefficient set (one coefficient for each input line) for an output line:

[−0,0019,0.0494,0.2152,−0.0128], [−0.0077,0.1327, 0.1327,−0.0077],

[−0,0128,0.2152,0.0494,−0.0019], [0.0,0.25,0.0].

Since there are four taps per output line, every fourth coefficient represents the coefficient for the adjacent line.

These coefficient sets are then rescaled so that each set sums to one and the resulting values are applied to the multiplier 41 as shown in FIG.5 and as shown in FIG. 8.

As illustrated in FIG. 7c, there is illustrated a design filter with six taps per output line with twenty-four different coefficients ranging from 0 to a maximum of 0.2 at the mid-point of coefficient 12. In that embodiment there would be six coefficients (six lines) for a given output line, and these coefficients would again be rescaled so that the set sums to 1. These scaled coefficients are the multiplier values in FIG. 5. FIG. 8 shows 3 to 4 scaling realization using Filter 1.

Figure 8A:
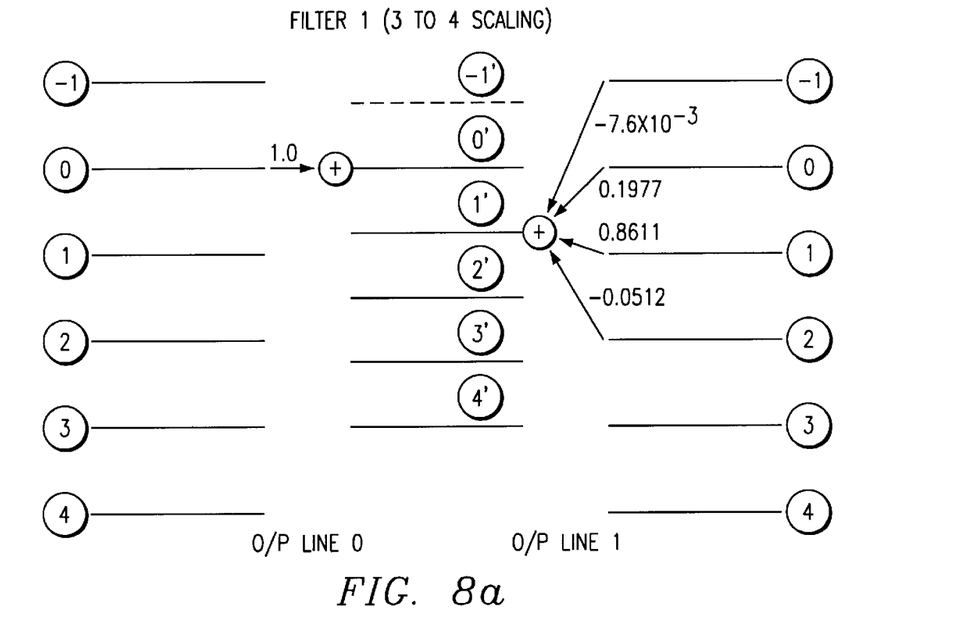
FIGS. 8a and 8b illustrates 3 to 4 scaling coefficients applied using first filter.

Referring to FIG. 8a, there is illustrated how the samplings would be applied to the lines in the 3 to 4 scaling. If an input line is directly in line with the output line as line 0 to 0', then it would be a 1 to 1 relationship. If not, Filter 1 with 4 taps would have the coefficient of −0.8611 from input line 1 to output line 1,' and the coefficients of −7.6×10⁻³ between input line −1 and output line 1', 0.197 from input line 0 to output line 1', and −0.0512 from input line 2 to output line 1'. These input line coefficients would sum up to the total sum of 1. These would be scaled from the coefficients represented by the Filter 1. This would represent for example the first set for the first output line, the second set would follow the next set of coefficients as binned for the second output line, the third output line would be the third set of coefficients binned, and the fourth output line be the fourth set or bin. Thereafter, it would repeat going back to the first set or bin, second, third, and then the fourth set or bin for the fifth, sixth, seventh, and eighth output lines.

Figure 8B:
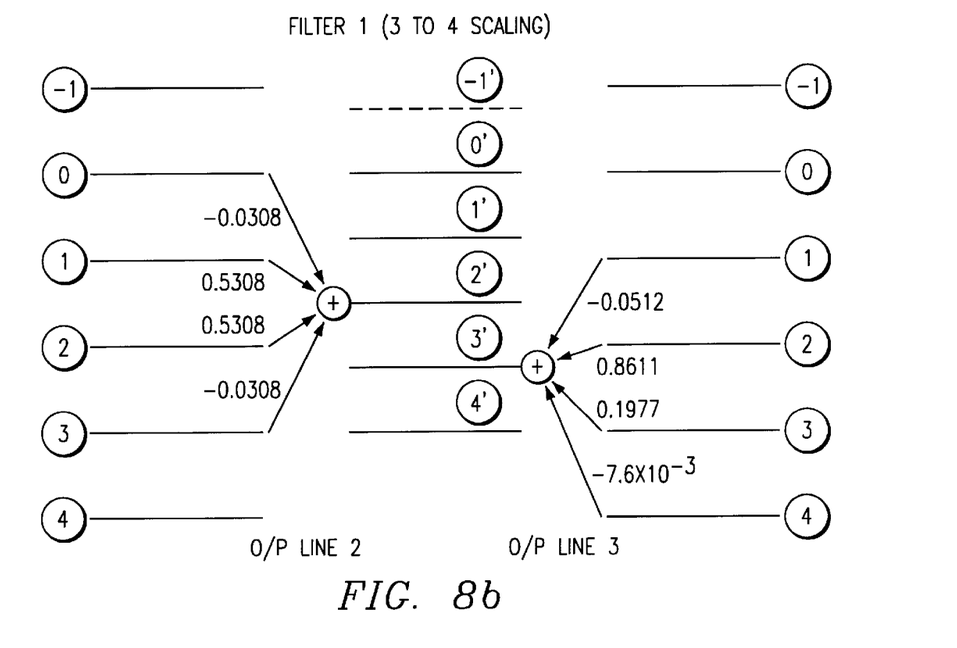

FIG. 8*b* also shows the 3 to 4 scaling for Filter 1, for output line 2' taken from line 0, 1, 2, and 3 with the coefficients being −0.0308, for input line 0, 0.05308 for lines 1 and 2, and −0.0308 for line 3. All of these coefficients would be rescaled to sum to 1 and that value would become the multipliers for the corresponding input line with the lines being appropriately delayed as summed as illustrated in FIG. 5 to derive the output value for line 2'. Similarly the input to output line 3' from input lines 1, 2, 3, and 4 would have the coefficients indicated as −0.0512 from line 1, 0.8611 from line 2, 0.1977 from line 3, and −7.6×10⁻³ from line 4.

Filter in FIG. 7*b* is:

[−0.0019, −0.0077, −0.0128, 0.0, 0.0494, 0.1327, 0.2152, 0.25, 0.2152, 0.1327, 0.0494, 0.0, −0.0128, −0.0077, −0.0019]

This is binned into:

A=[−0.0019, 0.0494, 0.2152, −0.0128]
B=[−0.0077, 0.1327, 0.1327, −0.0077]
C=[−0.0128, 0.2152, 0.0494, −0.0019]
D=[−0.0, 0 0.25, 0.0]

Elements of A sum to:

−0.0019 +0.0494+0.2152−0.0128=0.2499 dividing each element of A by this, $$\left[\frac{-0.0019}{0.2499}, \frac{0.0494}{0.2499}, \frac{0.2152}{0.2499}, \frac{-0.0128}{0.2499}\right]$$

=[−7·6×10⁻³, 0.1977, 0.8611, −0.0512]

Figure 9A:
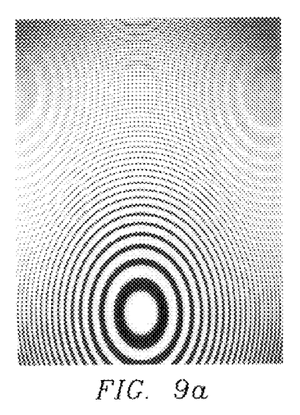
FIG. 9 illustrates the scaling results of bilinear filter (9a), first filter (9b), and second filter (9c) for 3 to 4 scaling.
Figure 9B:
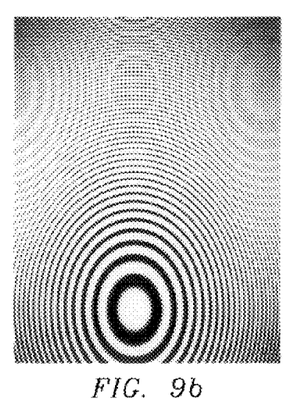
Figure 9C:
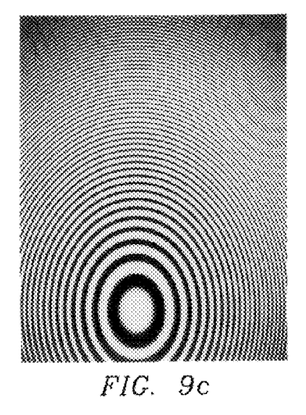

FIG. 9 shows the scaling results of bilinear (FIG. 9*a*), Filter 1 (FIG. 9*b*), and 2 (FIG. 9*c*) for 3 to 4 scaling on a circular zone plate. This is a standard test used to evaluate interpolation algorithms. Note the significant aliasing in the top picture with bilinear interpolation in FIG. 9*a*. The improvement with Filter 1 (FIG. 9*b*) and almost complete elimination of aliasing with Filter 2 (FIG. 9*c*).

The above scaling is vertical scaling by changing the number of horizontal lines. This scaling can also be applied to width scaling by changing the number of pixels (picture elements) per line and using adjacent pixels. FIG. 2 would have pixel delays rather than line delays. The steps in FIG. 3 of starting with an ideal frequency response and converting to an optimum frequency response by a smoothing estimation would be done. The filter coefficients would then be determined based on the number of taps per line. The coefficients are then binned and rescaled to equal one. The adjacent input pixels are multiplied by the coefficients and are summed to get the new output pixel.

What is claimed is:

1. A method of forming an optimal image scaling filter for converting a first number of input pixels to a second number of output pixels comprising the steps of:

determining an ideal frequency response for a given scaling factor;

determining from an ideal frequency response a smoothing optimal frequency response with a determined number of taps;

generating filter coefficients based on the determined number of filter taps and the optimal frequency response;

binning said coefficients into a set corresponding to the closest input pixels to said output pixel;

rescaling said coefficients in said set so that each said set sums to one;

multiplying the closest input pixels to an output pixel according to said rescaled coefficients in said set; and summing said multiplied input pixels in said set to achieve the output pixel value.

2. The method of claim 1 wherein said generating step includes using Parks-McClellan algorithm.

3. The method of claim 1 wherein said input pixels are on adjacent input lines and said output pixel is on a closest output line.

4. The method of claim 3 wherein said generating step includes using Parks-McClellan algorithm.

* * * * *